(12) United States Patent
Casey

(10) Patent No.: US 12,526,631 B1
(45) Date of Patent: Jan. 13, 2026

(54) MITIGATING WASTAGE ASSOCIATED WITH LAPSED SUBSCRIBER ACCOUNTS ON COMMUNITY-WIDE MANAGED Wi-Fi NETWORKS

(71) Applicant: Calix, Inc., San Jose, CA (US)

(72) Inventor: Martin L. Casey, Dallas, TX (US)

(73) Assignee: Calix, Inc., San Jose, CA (US)

( * ) Notice: Subject to any disclaimer, the term of this patent is extended or adjusted under 35 U.S.C. 154(b) by 182 days.

(21) Appl. No.: 18/438,257

(22) Filed: Feb. 9, 2024

(51) Int. Cl.
*H04W 12/082* (2021.01)
*H04W 12/06* (2021.01)
(Continued)

(52) U.S. Cl.
CPC ....... *H04W 12/082* (2021.01); *H04W 12/068* (2021.01); *H04W 12/72* (2021.01); *H04W 12/73* (2021.01); *H04W 84/12* (2013.01)

(58) Field of Classification Search
CPC ... H04W 12/082; H04W 12/72; H04W 12/73; H04W 24/00; H04W 48/16; H04W 8/183; H04W 84/12; H04W 12/06; H04W 12/062; H04W 12/08; H04W 88/08; H04W 48/00; H04W 48/02; H04W 48/08; H04W 48/20; H04W 4/24; H04W 60/00; H04W 76/38; H04W 76/10; H04W 8/18; H04W 12/61; H04W 28/00; H04W 28/16; H04W 4/30; H04W 4/60
See application file for complete search history.

(56) References Cited

U.S. PATENT DOCUMENTS 9,071,972 B1 * 6/2015 Wang .................. H04L 41/5019
2008/0151842 A1 * 6/2008 Tysowski .............. H04W 48/16
370/338
(Continued)

FOREIGN PATENT DOCUMENTS

CN 113573311 A * 10/2021 ............ H04W 12/08
WO WO-2008036938 A2 * 3/2008 ......... H04L 63/0853
WO WO-2017050108 A1 * 3/2017 ............ H04W 12/06

OTHER PUBLICATIONS

"Command Line Interface Reference Guide for SmartZone 3.5.1", Jun. 2017, obtained online from <https://support.alcadis.nl/Support_files/Ruckus/SmartZone//Manuals/SmartZone%203.5.x/SmartZone%203.5.1.0.862/Sz100Vsze-351-CLIGuide-20170616.pdf> (Year: 2017).*

(Continued)

Primary Examiner — Zhimei Zhu
(74) Attorney, Agent, or Firm — Staniford Tomita LLP

(57) ABSTRACT

Facilitating removal of lapsed profiles for a client attempting to access a Wi-Fi network by repeatedly sending requests to a server, the request includes a network address and profile of the client. For a lapsed profile, the server sends a message to a user regarding the lapse, where the message includes a list of all network addresses for client devices used to download the lapsed profile, and blacklists all clients used to download the lapsed profile after a rejected access request to prevent other access point from receiving spurious requests from the blacklisted clients. The Wi-Fi network may include numerous access points managed by a community Wi-Fi service provider and include a roaming access service provider allowing mobile client devices to subsequently access the AP devices automatically after a first successful access.

19 Claims, 3 Drawing Sheets

(51) Int. Cl.
*H04W 12/72* (2021.01)
*H04W 12/73* (2021.01)
*H04W 84/12* (2009.01)

(56) References Cited

U.S. PATENT DOCUMENTS

| | | | |
|---|---|---|---|
| 2010/0080202 A1* | 4/2010 | Hanson | H04W 12/084 |
| | | | 370/338 |
| 2017/0171910 A1* | 6/2017 | Takemura | H04L 67/303 |
| 2018/0109948 A1* | 4/2018 | Huber | H04W 12/069 |
| 2020/0053068 A1* | 2/2020 | Rong | H04W 12/08 |
| 2022/0046098 A1* | 2/2022 | Takemura | H04L 67/143 |

OTHER PUBLICATIONS

G. Soós and P. Varga, "On the Security Threat of Abandoned and Zombie Cellular IoT Devices," 2019 IEEE 17th International Conference on Industrial Informatics (INDIN), Helsinki, Finland, 2019, pp. 996-1001 (Year: 2019).*

* cited by examiner

300

| 1 | Manage Profile using Command Application |
|---|---|
| 2 | Implement Robust Email Deletion Reminder |
| 3 | Send Notification via Push Message at Later Date |
| 4 | Distribute Blacklisted MAC Addresses Across Geographic Area of APs |
| 5 | Place Blacklisted Client in a Walled Garden and Direct them to Delete Profile |
| 6 | Implement Robust Blacklist Mechanism Based on Rejection Message Type |

FIG. 3

MITIGATING WASTAGE ASSOCIATED WITH LAPSED SUBSCRIBER ACCOUNTS ON COMMUNITY-WIDE MANAGED Wi-Fi NETWORKS

TECHNICAL FIELD

Embodiments are directed to wireless networks, and specifically to managing subscriber accounts and removing lapsed subscribers from wireless networks.

BACKGROUND

Internet access is typically provided to homes and businesses through Internet Service Provider (ISP) or Broadband Service Provider (BSP) companies (collectively referred to herein as "BSPs") that offer high-speed communications interfaces through equipment such as cable modems and access to transmission lines (e.g., DSL, T1, Fiber, etc.). Such companies usually charge a monthly subscription fee to provide private access to residential (home) and business subscribers. Internet access via Wi-Fi can be made available to the general public (i.e., for "public users") on these public or private networks through services such as the Calix SmartTown™ Wi-Fi service.

Wi-Fi systems such as SmartTown utilize certain Wi-Fi alliance standards like Wi-Fi Alliance Passpoint 2.0 to provide Wi-Fi access to subscribers using certain Wi-Fi access point devices. Passpoint and similar services can be widely deployed across a network of public locations (e.g., hotels, shops, airports, stadiums, etc.). Once a user accesses the Wi-Fi network offered at a location, a Passpoint-enabled client device will automatically connect upon subsequent visits. This eliminates the need for users to search for and choose a network, request Wi-Fi access, and re-enter authentication credentials each time they visit. Passpoint automates the entire access process to enable seamless connectivity between Wi-Fi networks and mobile devices. Passpoint provisioning supports on-boarding of new devices by establishing credential information and providing policy information to the mobile device.

With the increased usage of Passpoint profiles in SmartTown deployments an issue arises with inactive or invalid profiles using up resources. Such user profiles are referred to as "zombie" profiles and are created as subscriber's passpoint profiles are suspended or deleted by the broadband service provider (BSP) as service contracts expire or are breached. In most deployments, Passpoint profiles that are manually installed are not automatically deleted from client devices after a user account is suspended or deleted by the BSP. This leads to requests for access from clients to SmartTown networks that will be rejected and increased load to radius servers through repeated attempts to connect by client devices. This can ultimately result in increased operational costs by processing all of the spurious radius requests. As an example, the popular and similar Eduroam service is facing this issue with many of the access requests it receives originating from non-active accounts (i.e., former students) roaming around different locations where Eduroam is available. These generate many radius requests that result in rejections. Every radius transaction has a cost, and this is run up since current device behavior is to keep trying to connect.

This problem can become significant as a deleted or suspended client moves through a SmartTown deployment, and this process is repeated over and over with each access point leading to more and more spurious radius requests. Current mitigation measures against such zombie accounts are unable to address this issue as SmartTown deployments grow to have ever-increasing numbers of clients.

What is needed, therefore, is a method for mitigating the effects of zombie profiles in Passpoint and similar network access services.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Calix, GigaSpire, GigaSpire BLAST, and SmartTown are trademarks of Calix, Inc.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 3 is a table listing six separate solution for facilitating removal of zombie profiles in a managed Wi-Fi system using Passpoint, under some embodiments.

DETAILED DESCRIPTION

Figure 1:
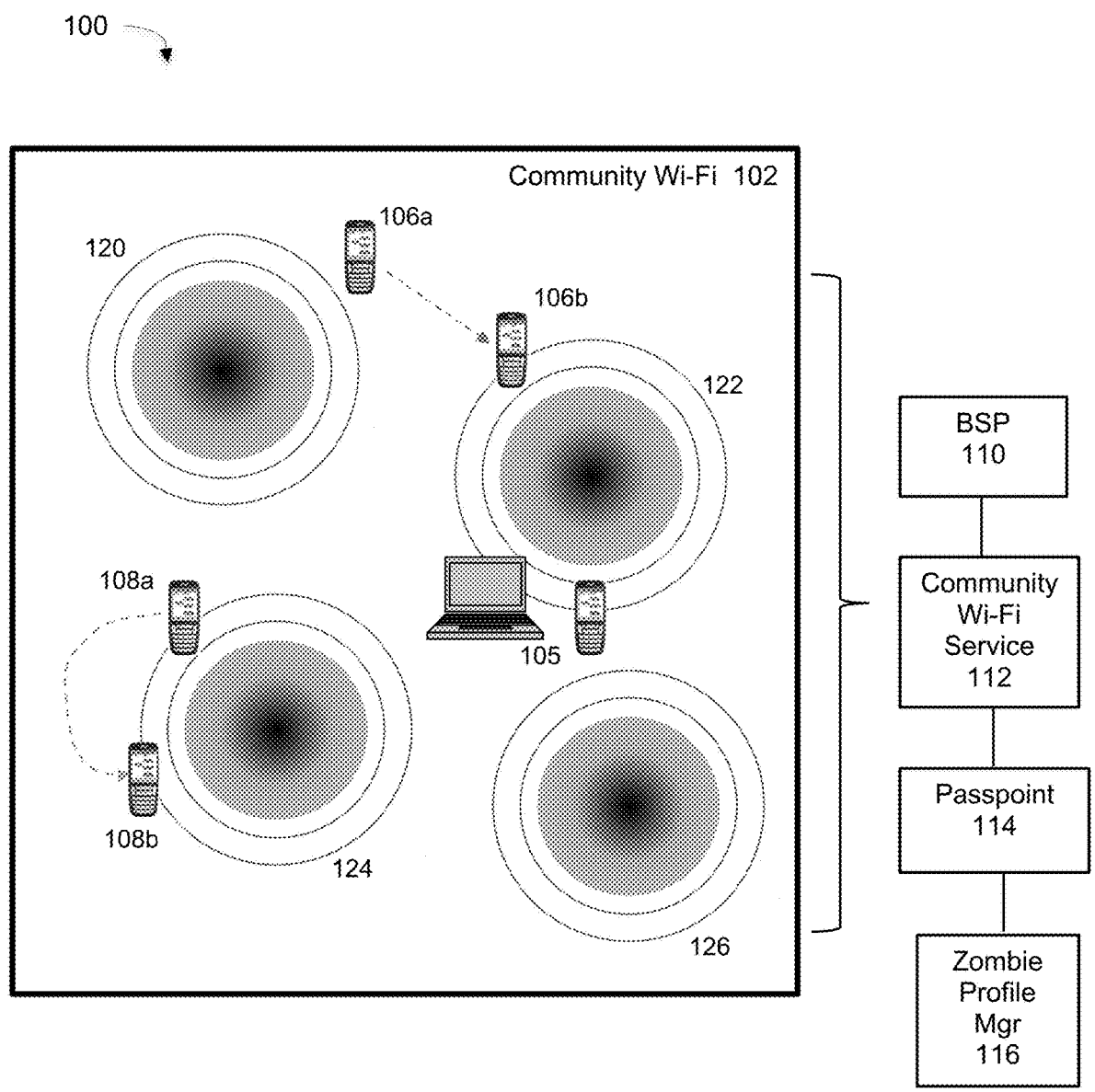
FIG. 1 illustrates a community-wide managed Wi-Fi deployment area implementing an automatic access and re-access process that includes a zombie subscriber mitigation process, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Embodiments are directed to systems and methods for mitigating the effect of zombie Passpoint profiles in community-wide managed Wi-Fi deployments, and reducing resource and cost wastage associated with automatic access retries of Wi-Fi clients in public Wi-Fi networks.

FIG. 1 illustrates a community-wide managed Wi-Fi deployment area implementing an automatic access and re-access process that includes a zombie subscriber mitigation process, under some embodiments. Overall environment 100 includes a community Wi-Fi network or area 102 that comprises a number of Wi-Fi hotspot sites that provide Wi-Fi coverage and access for users within the area 102. For the example of FIG. 1, four hotspot sites 120, 122, 124, and 126 are shown, but any practical number of hotspot sites may be provided. Each site provides coverage over a certain area or radius depending on location, configuration, equipment capability (power), geographical constraints, and so on.

The Wi-Fi sites (120-126) generally represent a "premises network" that may be building, business, home, or other similar facility or outdoor location (e.g., park, city square, etc.). Each premises network includes a gateway device to access the Internet, and such Internet access is generally provided by a broadband service provider (BSP) 110 for a fee or monthly subscription that provides uninterrupted Internet service at certain agreed upon performance levels, such as access speed, data transfer rate, minimum outage periods, data security protections, and so on. Depending on such usage terms, any number of users may access the Internet through one or more of the hotspot sites, typically for free (for basic service) or using a subscription plan (e.g., for premium service).

The Wi-Fi components are generally implemented using wireless protocols, such as IEEE 802.11, Bluetooth. Some of the transmission links used in network 100 may be cellular communication links or any other telephonic or WAN/LAN network link.

It should be noted that FIG. 1 illustrates an example network and many different network configurations and topologies are possible. Devices (or nodes) can be added to the network, or organized into sub-networks as provided by certain known networking protocols. A network of any practical scale, architecture, and configuration can be used with embodiments of the processes and components described herein.

In an embodiment, environment 100 includes a community Wi-Fi service, such as the Calix SmartTown™ Wi-Fi managed environment that provides solutions for BSPs to craft community-wide managed support. Such a service enables BSPs to seamlessly bring critical managed Wi-Fi services to communities at scale, and have become popular in rural areas along with traditional urban centers to provide Wi-Fi to many different strata of users. Using this system BSPs can connect to subscribers while they are in public and engaging in a variety of different activities.

In some implementations, the SmartTown Wi-Fi provides community-wide coverage by combining wide-scale residential and small business Wi-Fi systems with strategically deployed hotspot Wi-Fi access points in public gathering areas, event centers, and private locations, such as by leveraging private network resources. The community Wi-Fi service can be provided on a temporary basis for special events, such as concerts, fairs, sporting events, rallies, and so on, in which Wi-Fi demand may be very heavy for a relatively short duration. Alternatively, it may be provided on a permanent or semi-permanent basis for an open location, such as a public square, meeting area, and so on.

In an embodiment, the SmartTown (or similar) community Wi-Fi system is a service that utilizes certain Wi-Fi alliance standards (e.g., Wi-Fi Alliance Passpoint 2.0) to provide Wi-Fi access to subscribers using certain Wi-Fi access point devices. One such example device is a Calix Gigaspire BLAST. These devices extend the access network into the home and act as a strategic location for control of the network by supporting broadband connectivity of data and video services and offering the latest 802.11ax 'Wi-Fi 6' technology. The Calix GigaSpire provides switching and routing functions that support multi-Gigabit throughput for IPTV video and data services. An example device, the GigaSpire BLAST u6.2, uses a 2.5 Gigabit Ethernet link at the subscriber's premises to provide carrier-class Wi-Fi. The GigaSpire BLAST u6.1 uses a one Gigabit Ethernet link at the subscriber's premises to provide carrier-class Wi-Fi. Other models can support an SFP+ module that allows for one Gigabit to ten Gigabit connections using Ethernet, Active Ethernet and GPON. Any number of interfaces (e.g., four) Gigabit Ethernet LAN interfaces can be provided for customer multi-media devices. Such operating parameters are provided for purposes of example only, and other similar access point devices can also be used.

Although such access may be provided to users for free or for a small nominal cost, BSPs usually require some sort of access request and permission grant to use their Wi-Fi network. This often requires the user to log in and provide credentials that might include user identity and password, as well as consent to the BSPs terms and conditions for use. Subsequent use of the same network typically requires users to find and authenticate same network each time they visit the site.

In an embodiment, a service, such as Passpoint 114 is used to streamline Wi-Fi access and eliminate the need for users to re-authenticate themselves in previously used network. FIG. 1 illustrates various types of users of the community Wi-Fi service 112. These include static users 105 that may rely on using one Wi-Fi hotspot (e.g., 122), but more typically include dynamic users that move through the area 102 and often use more than one hotspot, such as device 106a, which moves from a first location (hotspot 120) to a second location (hotspot 122) during one session, or a user 108a that uses a hotspot (124) at a first time and then returns to the same hotspot at a later time 108b. The PassPoint profile can be pre-installed by the user before encountering the public Wi-Fi network (and agreeing to terms and conditions), either at their home network or over the LTE/5G network. In any case, the PassPoint service 114 allows these users to access a hotspot automatically after a first access based on their original subscription information, thus saving the user the burden of re-subscribing each time they re-enter the hotspot area.

Passpoint (also known as Hotspot2.0) represents a class of services that provide a basis for global Wi-Fi roaming standards. It provides automatic network discovery and selection, seamless network access and roaming between hotspots, and enhanced security (e.g., WPA2, WPA3). It is natively supported by major mobile operating systems such as Android, IOS, macOS, and Windows, and provides streamlined, enterprise-class device provisioning and credential management for enterprise and other private networks. The user operated devices, 105, 106a, 108a, may be any suitable Wi-Fi enabled device, such as smartphones, tablet computers, laptops, and so on.

The Passpoint or other Wi-Fi access server requires a static or roaming user to sign-up or otherwise explicitly request access to a hotspot site the first time that the user tries to access the site. Typically this requires the user to provide identifying information and agree to terms and conditions of the BSP 110 and/or community Wi-Fi service provider 112. Alternatively, the PassPoint profile can be pushed by mobile operators, downloaded directly by the user after a link is shared (e.g., through email, SMS, or other means), or embedded and installed as part of application. Regardless of installation method, once the user has signed up, they need not re-subscribe again the next time they enter the hotspot area after leaving or signing off. The Passpoint server will retain the user credential information and the compatible device (phone, tablet, etc.) will use this information to re-access the hotspot automatically.

Although embodiments are described with respect to Passpoint services, embodiments are not so limited, and any other Wi-Fi roaming and automated credentialing, access and handover service may also be used.

Figure 2:
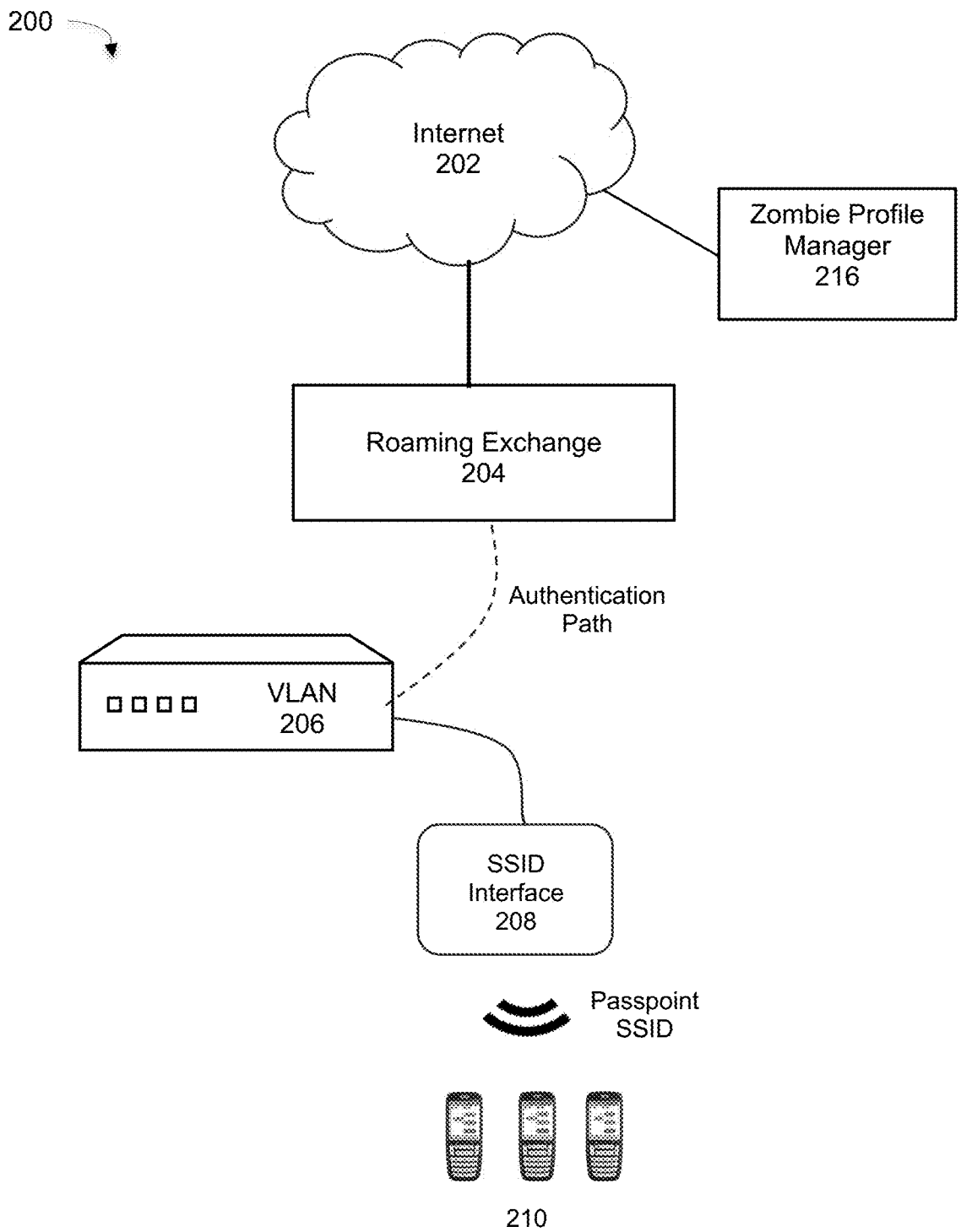
FIG. 2 illustrates a PassPoint based system implementing a zombie profile manager, under some embodiments.

FIG. 2 illustrates a PassPoint based system 200 implementing a zombie profile manager, under some embodiments. As shown in FIG. 2, system 200 comprises several mobile devices 210 that attempt to access the Internet 202. Access to this network is provided by a roaming exchange 204, which acts as a hub for GPRS connections from roaming users. Access to the roaming exchange 204 is usually provided by a virtual area local network (VLAN) 206, which is a virtualized connection that connects multiple devices and network nodes from different local area networks into one logical network. The wireless mobile devices 210 access the VLAN 206 through and service set identifier (SSID) interface 208 that allows stations to connect to the same target network when multiple independent networks operate in the same physical area. Various different Wi-Fi SSIDs may be supported, such as enterprise SSID (802.1X—Corp), Open SSID, and others. For the embodiment of FIG. 2, SSID includes a Passpoint SSID (802.1X) interface, as shown.

In general, the term 'access point' (AP) refers to a gateway device that is assigned a service set identifier (SSID), which is an alphanumeric string that uniquely names a wireless LAN (WLAN) as a network name. A WLAN may consist of several APs, all using the same SSID or different SSIDs, and each AP may emanate one or more SSIDs. For example, a residential gateway (Wi-Fi router, modem, etc.) may have an SSID: 'owner' with a guest network 'owner_guest.' Moreover, each SSID (which are themselves APs) may support more than one band (e.g., 2.4 GHz and 5 GHz). Thus, one gateway device may support multiple (e.g., 4 or more) APs. In networks where extenders (e.g., 220) connect wirelessly to the residential gateway and are used to boost Wi-Fi signals in the residence, backhaul SSIDs may be used, where the backhaul is an AP/VAP (access point/virtual access point).

In system 200, or any similar Wi-Fi system, a request to access the Internet typically comprises a message to the service provider that includes the client device's MAC address and profile. The MAC or Media Access Control address is the unique identifier assigned to a network device connected to a network, including a Wi-Fi network. The profile or "authorization profile" defines a set of permissions to be granted for a network access request and can include a profile name, description, and any associated filters. For subscription-based services, the profile my also include account ID and similar information. Profiles that are no longer valid for any reason should be deleted as their existence and continued use can have an adverse effect on Passpoint and similar service operations.

As stated previously, a significant issue can arise when devices belonging to non-active (zombie) accounts are detected within a hotspot and automatically attempt to re-access the hotspot. This often happens in the background without the user's knowledge. Many devices are configured to periodically request access to the hotspot, and depending on a user's duration of proximity to the hotspot, such requests can number hundreds to thousands of requests in a period of time. If many such inactive users are present in a hotspot, these requests can stretch the hotspot capacity and incur significant costs to the BSP.

In an embodiment, system 200 includes a zombie profile manager 216 that is provided in component form as part of, or as a process executed by an element within the roaming exchange 204.

In an embodiment, the zombie profile manager 216 is provided and executed as a service in the cloud (e.g., network 202). It handles the messages from the access points about clients that have been rejected and then tells services to send out messages (via txt/email) that a client is using an expired profile that should then be deleted. The manager 216 would also manage the lists of access points to which the blacklisted MAC addresses should be propagated.

Although shown as a cloud-based service, the zombie profile manager may also be provided as a processing component in the roaming exchange 204 (for example) or any other existing or special node in system 200.

For purposes of description, the term "zombie profile" means a Passpoint (or similar service) profile downloaded on a subscribers device that is no longer valid, such as if the account associated with the profile has been deleted or suspended by the service provider. The client device with this profile will still keep trying to connect to Passpoint networks that it believes it can access based on a previous subscription or access grant.

In an embodiment, various different mitigation measures may be used to alert the system and/or users that a zombie account associated with the user is attempting to access a Passpoint hotspot. These can include sending an email to the user when an account is deleted, and/or blacklisting clients after a defined number of failed connection attempts.

In the first option, the community Wi-Fi service provider 112 sends an email to the user with instructions on how to delete the profile. However, even with this option, users will not always follow through on deleting the profile, or will not delete the profile from all devices, thus leading to the creation of Zombie profiles.

In the second option, the community Wi-Fi service provider 112 can also blacklist a client at a certain access point (AP) where the client is attempting to connect after a number (e.g., 10) of failed connection attempts. This number can be tailored to accommodate certain circumstances such as no response, corrupted radius requests in the network, timing issues and to provide the user with time to manually select a different profile with which to connect.

Passpoint profiles can also be configured with an expiration date that can force users to refresh their profiles over time. These expiration dates, however, are not always effective when the profile is downloaded and installed from certain legacy websites.

Certain embodiments of the zombie profile manager 116 or 216 expand on the communication/blacklist processes to help stop spurious radius requests from zombie profiles attempting to connect to SmartTown or other APs broadcasting Passpoint communities. For purposes of description, the term 'radius request' refers to requests to authenticate and authorize users to remote Wi-Fi networks, VPNs, connection interfaces, and so on using a Remote Authentication Dial-In User Service (RADIUS or radius). Radius is generally understood to be an industry standard for Wi-Fi access management, and relies on WPA2 enterprise protocol on wireless access points, i.e., a shared SSID and password process for credential exchange.

In an embodiment, a suite of six separate solutions is provided, as shown in Table 300 of FIG. 3. Each solution can be implemented by itself, but an overall mitigation strategy would typically involve combining sets of solutions in a multi-pronged approach to mitigate the effect of zombie accounts in service providers SmartTown (Passpoint) networks. The combined solutions when deployed should help stop zombie profiles from consuming back-end resources by identifying these profiles and helping to get them uninstalled from users' devices.

A first solution (1) listed in Table 300 is to manage Passpoint profiles via a command application, such as Calix CommandIQ or CommandWorx used with a SmartTown deployment. In this embodiment, Passpoint profiles are downloaded via micro sites by the user. Using the application to download and control the Passpoint profiles on the client would help the community service Wi-Fi provider 112 by indicating when an account is deleted or suspended. The application could be notified as part of the suspension to delete the profile so the client will no longer be able to use it.

In an embodiment, such a command application is an app that is downloaded and executed on the user device. For example, CommandIQ is a mobile application that allows users to perform tasks such as resetting the primary SSID or password for Wi-Fi, run performance tests, view and assign connected devices to profiles, create guest networks, add new devices, set permissions and security, and so on. CommandWorx is a similar application that is directed to small business users and provides certain business management features in addition to the user features described above. Such applications can also be used to control user access. For example, for paywall clients with a Passpoint profile that run out of time or money, their profile could be deleted until the subscriber adds more time or renews the subscription.

The system allows the service provider to control the Passpoint profiles of different users. A user can download a mobile application onto their device to receive instructions from the service providers to add or remove profiles. The application can also give alerts that the profile/account had lapsed and access has been lost. The application operates by receiving instructions from processes embedded in the zombie profile manager.

With respect to this solution, the management of the profiles on the primary account holders, and to a lesser extent secondary account holder's client device, does not depend on the client doing anything, as it is taken care of automatically. This solution also helps with onboarding the primary and secondary account holder's devices and profiles could be automatically pushed down when the BSP gives access to a community, or at least notifications they have profile with a link to the profile to click and download and install.

A possible shortcoming of this solution is that it only removes profiles if the account holder has a client device with the application installed, and these actions do not affect any other devices the subscriber may have installed the Passpoint profile on.

A second solution (2) listed in Table 300 is to implement a more robust message (email) based deletion reminder scheme. An email message that asks the user to remove a Passpoint profile with appropriate instructions is sent to the user. This email can be further enhanced with a list of each device's MAC address that was used to download the Passpoint profile to which they no longer have rights. The email could be enhanced to include this list of devices by MAC address, or using the client tables of the primary account might be able to match the MAC address of a specific client type to help correlate the MAC address to known clients in the community Wi-Fi service provider network (e.g., Calix cloud), which maintains a list of onboarded devices with the profile that link to the subscriber's account. With paywall profiles that run out of time/money, the email could also include links for the subscriber to add money/time to the account to keep using the service.

The advantage of this method is that it helps the subscriber know which devices and how many devices they installed the Passpoint profile on, but again relies on the subscriber actually taking action to perform the task. Also, randomizing MAC address behavior in the clients might not always be helpful in giving useful information to the subscriber to help them identify the clients that need to have the Passpoint profile deleted from. In addition, certain GDPR or privacy regulations might prevent the attempt to correlate the client's MAC address with other known client information.

Although certain solutions are described with respect to sending email messages, embodiments are not so limited. Any appropriate messaging mechanism may be used, such as text message voice message or any other asynchronous messaging means.

A third solution (3) listed in Table 300 is to send a notification through an application push or email reminder at a later date when a client gets blacklisted to notify the user that they still have clients with zombie profiles that should be deleted. For example, when an access point receives a radius reject for a user that causes the AP to blacklist the client, a notification could be sent to the cloud from device operating system (e.g., EXOS on Calix Gigaspire) to send a notification via email or text with information about the client. The message would indicate that an expired Passpoint profile linked to their account is attempting to connect and to delete the account to improve Wi-Fi performance with instructions on how to delete it. With paywall profiles that get rejected due to time/money the email or notification to the application would be triggered to let the subscriber know how to regain access or delete the profile if they do not plan to use it in the future.

This is a fairly easy solution to implement and help enhance the subscriber's experience and assists the BSP manage their subscribers. It also assists the back-end by helping subscribers identify and delete expired profiles. This solution, however, may require the system to keep deleted account information to implement this successfully in the cloud, thus using up resources and possibly implicating GDPR/privacy concerns. Also, it may cause some degree of subscriber annoyance due to repeated notifications, thus care needs to be taken on the number of notifications sent and their frequency. Furthermore, the Passpoint profile could be also be installed on a device the subscriber no longer has control over.

A fourth solution (4) listed in Table 300 is to distribute a list of blacklisted MAC addresses across a geographic area of access points. For this solution, when an AP blacklists a client for too many failed radius requests due to a zombie profile, the AP messages the MAC address of the zombie client to the cloud. This MAC address could then be propagated/broadcast to other APs in a managed list to add the MAC to their current blacklisted addresses. The list of APs in the cloud could be by geographic location (e.g., venue location, network location, etc.). The amount of time the device remains on the blacklist could also be configured, as it is desirable to allow the device to be able to connect to networks if the account is reinstated.

Depending on blacklist time, the client, once blacklisted would be blacklisted across a range of APs thus stopping the client going from AP to AP and generating spurious radius requests. This solution requires backend mechanisms to be able to maintain and manage a list of APs and handle the request to send out blacklist requests.

A fifth solution (5) listed in Table 300 is to place the client in a walled garden when blacklisted and redirect them to delete their profile and possibly download a new valid profile. For this embodiment, when a client device is about to be blacklisted for too many invalid requests, the AP instead connects them and places the device in a walled garden on the AP redirecting the client to a local hosted webpage explaining that the current profile in use has expired. Instructions on how to delete and re-establish a profile to improve Wi-Fi performance can also be provided, along with instructions and links for downloading a new valid Passpoint profile. With a paywall profile, this could allow the subscriber to added time/money to the account to allow for Internet access.

This solution is advantageous in that it catches the user in the act of using a zombie profile and gives them instructions directly as well as offering away to onboard them with a new and valid profile. It does not, however, ensure that the user will actually delete the zombie profile after getting the new one. It also requires a bit of work on the AP to handle the redirect and different host pages to be setup, and imposes the need to manage IP addresses.

A sixth solution (6) listed in Table 300 is to implement a robust blacklisting mechanism based on the type of radius rejection message. Certain circumstances can lead to rejecting a client from connecting on their home system based on account identifiers. Based on the radius reject message type (with a reason code), for example "user not found", "user profile suspended", "user out of time" (in the case of paywall user), and similar, the system could blacklist the MAC address right away as zombie profile client. When used in conjunction with any of the other solutions described above, this could help reduce the number of spurious radius requests from zombie profile clients. This solution does require the system to make sure valid clients do not get accidentally blacklisted.

A potential alternative to the above solutions if the zombie profile issue becomes particularly bad in a service provider's network is to change the Roaming Consortium Organization Identifier (RCOI) (or other identifier) that been broadcast by the AP and start fresh with a new RCOI and communities. This approach is quite drastic as it would require all existing subscribers with working profiles to download new profiles.

Overall, the processes and components described herein provide a method of mitigating the wastage effects of zombie profiles in a community-wide managed Wi-Fi system through one or more messaging and blacklisting operations that prevent zombie profile devices from repeatedly sending spurious access requests to APs while roaming in the system.

As described above, in an embodiment, system 100 includes processing components that may be implemented as a computer implemented software process, or as a hardware component, or both. Such components may be an executable module executed by the one or more computers in the network, or they may be embodied as a hardware component or circuit provided in the system. The network environment of FIG. 1 may comprise any number of components coupled over the Internet or similar large-scale network or portion thereof. Each node in the network(s) comprises a computing device capable of executing software code to perform the processing steps described herein.

Such a device may include a processor, memory, interfaces, high-speed expansion ports, and interconnected busses. The processor can process instructions for execution within the computing device, including instructions stored in the memory or on a storage device to display graphical information for a (graphical user interface) GUI on an external input/output (I/O) device, such as a display coupled to high speed interface. In other implementations, multiple processors and/or multiple busses may be used, as appropriate, along with multiple memories and types of memory.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In an embodiment, an ASIC design can be used to implement system algorithms as well as hardware accelerated designs for specific use cases.

These computer programs (also known as programs, software, software applications or code) can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The present disclosure, in various embodiments, includes components, methods, processes, systems and/or apparatus substantially as depicted and described herein, including various embodiments, subcombinations, and subsets thereof. Those of ordinary skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of facilitating removal of lapsed profiles for a client device attempting to access a Wi-Fi network, comprising:
    receiving an indication that the client device is repeatedly sending access requests to a server to access an access point (AP) in the Wi-Fi network, the access request including a network address and profile of the client device;
    determining that the profile is lapsed due to user behavior associated with the client device;
    sending a message to a user of the client device regarding the lapse of the profile, wherein the message includes a list of all network addresses for client devices used to download the lapsed profile; and
    blacklisting the client devices used to download the lapsed profile after a rejected access request to prevent other APs from receiving spurious access requests from the blacklisted client devices.

2. The method of claim 1 wherein the Wi-Fi network comprises a community Wi-Fi environment managed by a community Wi-Fi service provider, and wherein the repeatedly sent access requests each impose a resource and cost burden on the community Wi-Fi service provider.

3. The method of claim 2 wherein the community Wi-Fi service provider implements Wi-Fi alliance standards to provide Wi-Fi access to the Internet to subscribers through Wi-Fi access point (AP) devices.

4. The method of claim 3 wherein the Wi-Fi environment comprises a plurality of Wi-Fi hotspots as the AP devices, each hotspot providing Wi-Fi access within a prescribed and limited operating range.

5. The method of claim 4 further comprising a roaming access service provider allowing mobile client devices to subsequently access the AP devices automatically after a first successful access involving authentication of a respective client device using a profile within an access request.

6. The method of claim 5 wherein the roaming access service provider comprises an Passpoint service provider.

7. The method of claim 1 wherein the access requests comprise RADIUS (remote authentication dial-in user service) request, and wherein the server comprises a RADIUS server.

8. The method of claim 1 wherein the message is sent by at least one of electronic mail message to a user account, voice message to the client device, or text message to the client device.

9. The method of claim 1 wherein the lapse of the profile by the user behavior is due to at least one of: suspension or deletion of a profile by a service provider, or expiration or cancellation of a service contract covering the client device.

10. The method of claim 9 further comprising allowing the user to download a mobile application to the client device through which the service provider can send instructions to add or remove the profile, or send a notification of the lapse of the user account.

11. The method of claim 1 further comprising propagating a message of the blacklisted client devices to all of the other APs.

12. The method of claim 7 further comprising blacklisting a network address immediately based on a RADIUS rejection message type.

13. The method of claim 1 further comprising redirecting the client device to a hosted facility indicating that the profile is lapsed to encourage the user to delete the profile.

14. A method of reducing resource use and costs in a community Wi-Fi network comprising a plurality of access point (AP) hotspots proving Internet service to client devices, the method comprising:
    first providing access to the AP hotspots by a community Wi-Fi service provider;
    second providing automatic subsequent access to the AP hotspots after a first success access by a client device through a roaming service provider, wherein each request includes a network address and profile of the client device, and imposes a cost on the service provider; and
    reducing spurious periodic requests for access to the AP hotspots by client devices associated with lapsed profiles by sending a message to a user of the client device regarding the lapse of the profile, wherein the message includes a list of all network addresses for client devices used to download the lapsed profile, and blacklisting the client devices used to download the lapsed profile after a rejected access request to prevent other APs from receiving spurious access requests from the blacklisted client devices.

15. The method of claim 14 wherein the access requests comprise RADIUS (remote authentication dial-in user service) request, and wherein the server comprises a RADIUS server, and further wherein the roaming access service provider comprises an Passpoint service provider.

16. The method of claim 14 wherein the lapse of the profile by the user behavior is due to at least one of: suspension or deletion of a profile by a service provider, or expiration or cancellation of a service contract covering the client device.

17. The method of claim 16 further comprising allowing the user to download a mobile application to the client device through which the service provider can send instructions to add or remove the profile, or send a notification of the lapse of the user account.

18. The method of claim 17 further comprising at least one of: propagating a message of the blacklisted client devices to all of the other APs, blacklisting a network address immediately based on a RADIUS rejection message type, or redirecting the client device to a hosted facility indicating that the profile is lapsed to encourage the user to delete the profile.

19. A system for reducing resource use and costs in a community Wi-Fi network comprising a plurality of access point (AP) hotspots proving Internet service to client devices, the method comprising:
- a community Wi-Fi service provider component providing access to the AP hotspots;
- a roaming service provider component providing automatic subsequent access to the AP hotspots after a first success access by a client device, wherein each request includes a network address and profile of the client device, and imposes a cost on the service provider; and
- a profile manager component reducing spurious periodic requests for access to the AP hotspots by client devices associated with lapsed profiles by sending a message to a user of the client device regarding the lapse of the profile, wherein the message includes a list of all network addresses for client devices used to download the lapsed profile, and blacklisting the client devices used to download the lapsed profile after a rejected access request to prevent other APs from receiving spurious access requests from the blacklisted client devices.

* * * * *